United States Patent
Miki et al.

[11] Patent Number: 5,976,676
[45] Date of Patent: Nov. 2, 1999

[54] POLYESTER FILM AND DECORATIVE PLATE USING SAME

[75] Inventors: Takatoshi Miki; Kenji Yoshihara, both of Shiga-ken, Japan

[73] Assignee: Mitsubishi Polyester Film Corporation, Tokyo, Japan

[21] Appl. No.: 08/779,206

[22] Filed: Jan. 6, 1997

[30] Foreign Application Priority Data

Jan. 10, 1996 [JP] Japan ................................ 8-019487
Feb. 21, 1996 [JP] Japan ................................ 8-058475

[51] Int. Cl.⁶ .......................... B32B 7/12; B32B 21/04; B32B 27/06; B32B 27/36
[52] U.S. Cl. ..................... 428/201; 428/203; 428/343; 428/354; 428/480; 428/481; 428/914
[58] Field of Search .................. 428/195, 200, 428/201, 203, 204, 206, 207, 480, 483, 914, 343, 354

[56] References Cited

U.S. PATENT DOCUMENTS

| | | | |
|---|---|---|---|
| 4,715,913 | 12/1987 | Middleton | 156/85 |
| 5,171,625 | 12/1992 | Newton | 428/195 |
| 5,384,354 | 1/1995 | Hasegawa et al. | 524/539 |
| 5,591,518 | 1/1997 | Sumiya et al. | 428/318.4 |

FOREIGN PATENT DOCUMENTS

| | | |
|---|---|---|
| 0 249 109 | 12/1987 | European Pat. Off. . |
| 0 588 276 | 3/1994 | European Pat. Off. . |
| 5-156040 | 6/1993 | Japan . |
| 6-79830 | 3/1994 | Japan . |
| 6-190969 | 7/1994 | Japan . |
| 7-17005 | 1/1995 | Japan . |
| 7-238176 | 9/1995 | Japan . |
| 8-003334 | 1/1996 | Japan . |
| 8-156182 | 6/1996 | Japan . |
| 1 315 489 | 5/1973 | United Kingdom . |
| 1 399 624 | 7/1975 | United Kingdom . |

OTHER PUBLICATIONS

Japanese Patent Abstract, Derwent Publications Ltd., JP 03 121137, May 23, 1991.
Japanese Patent Abstract, Derwent Publications Ltd., JP 01 285324, Nov. 16, 1989.

Primary Examiner—Vivian Chen
Attorney, Agent, or Firm—Foley & Lardner

[57] ABSTRACT

A polyester film for a decorative plate of the present invention, comprises at least the said polyester film and a picture printed layer which are in turn laminated over a surface of a wood substrate, wherein the polyester film has a optical density of 0.1 to 5.0 and longitudinal and transverse heat shrinkage percentages of from −10% to +10% after heat-treated at 180° C. for 5 minutes wherein the polyester film has a longitudinal and transverse tensile moduli in each direction of less than 600 kg/mm². The polyester film for a decorative plate or a decorative sheet can generate no harmful gases upon burning such as incineration, can produce a picture pattern having a high design value thereon without adverse influence by the color tone of the substrate, and is excellent in dimensional stability.

16 Claims, No Drawings

POLYESTER FILM AND DECORATIVE PLATE USING SAME

BACKGROUND OF THE INVENTION

The present invention relates to a polyester film and a decorative plate using the polyester film. More particularly, the present invention relates to a polyester film for a decorative plate, which is free from environmental pollution upon burning such as incineration and capable of producing a picture pattern having a high design value thereon, and which has a high dimensional stability, a polyester film for a decorative sheet laminated by clear film, which is excellent in suitability for V-cutting process and resistance to impact deformation, a decorative plate or sheet using the polyester film, and a decorative plate or sheet laminated by clear film using the polyester film.

The decorative plate is in the form of a laminated sheet in which at least a film layer and a picture-printed layer are in turn superimposed over a surface of a substrate. For example, decorative plates in which an adhesive layer, a film layer and a picture-printed layer are in turn laminated over a surface of a substrate are called "printed decorative plates", and decorative plates in which an first adhesive layer, an inner film layer (A), a picture-printed layer, a second adhesive layer and an outer film layer (B) are in turn laminated over a surface of a substrate are called "decorative plates laminated by clear film".

The "decorative plate" used in the present invention generally means a building surface material capable of being dealt as an independent product. Whereas, a "decorative sheet" used in the present invention generally means a decorative surface material which is adapted to adhere to a surface of a substrate for various products such as furniture, building components or household appliances and provided at a surface thereof with a picture-printed layer. Accordingly, the film layer and the picture-printed layer laminated over the substrate of the decorative plate are regarded as components of the decorative sheet. Incidentally, as the substrates, wood-based boards such as plywood or particle boards, inorganic boards, steel boards or the like can be appropriately used.

Especially, the decorative plate laminated by clear film has such advantages that (i) an appropriate protection for the picture-printed layer can be attained by the outer film layer (B), (ii) when the outer film layer (B) is composed of a transparent film, the decorative plate can exhibit a high-grade picture pattern, or (iii) when the outer film layer (B) is composed of an embossed film, the decorative plate with a three-dimensional moire finishing can be produced. For these reasons, the decorative plates laminated by clear film can be used in higher-grade applications as compared with the printed decorative plates.

Owing to the afore-mentioned advantages, the decorative plates laminated by clear film can be applied to front face decorations of various furniture, doors or the like. In the case of furniture, doors or the like composed especially of a wood-based board, corners are defined by adjacent two flat portions which are crossed at a right angle. These corners can be formed by bending the afore-mentioned decorative plate.

The bending of the decorative plate has been generally performed by a so-called V-cutting process. In the V-cutting process, V-shaped notches are formed on a surface of a substrate of the decorative plate such that the depth of each notch is slightly smaller than the thickness of the substrate. The decorative plate is then bent at these V-shaped notches such that the notched surface of the decorative plate is located inside. For this reason, the suitability for denting deformation process, of the decorative plate is highly relied upon those of the films used therein. Especially, in the case of the decorative plates laminated by clear film in which inner and outer films are used, it is required that these films show more excellent suitability for denting deformation process as compared with in the case of the printed decorative plate having only one film. If the films are deteriorated in suitability for bending deformation process, the bent shape of the decorative plate cannot be kept stable when subjected to V-cutting and bending processes, but readily returns back to its original flat shape. Further, at this time, there is a likelihood that the decorative sheet composed of the inner film layer (A), the picture-printed layer, the adhesive layer and the outer film layer (B) is separated from the substrate, so that the decorative plate is deteriorated in its appearance or design value. Therefore, the films used in the decorative plate laminated by clear film is advisable to show excellent suitability for V-cutting and bending processes.

Also, in the case where the decorative plate is used as surface materials for furniture, doors or the like, it is inevitably brought into contact with, for example, tip ends of a cleaner, nails or the like. If the films adhered to the substrate of the decorative plate have low self-healing properties (restoring properties), dents caused thereon by the afore-mentioned contact are left as they are, so that a high design value of the picture pattern of the picture-printed layer cannot be maintained. In addition, if the films adhered to the substrate of the decorative plate do not have an appropriate strength or rigidity, plastic deformation thereof becomes increased and it is impossible to remove such dents by self-healing. Especially, in the case of the decorative plate laminated by clear film, it is advisable that the films to be adhered to the substrate of the decorative plate are excellent in self-recovery for dent deformation (resistance to impact deformation) which is a total property combining the afore-mentioned self-healing properties and strength or rigidity.

As a sheet material (base film) interposed between the substrate and the picture-printed layer of the decorative plate or used in the decorative sheet, vinyl-chloride resin sheets can be most generally used. However, in the case where the vinyl-chloride resin sheet is used, there arise such problems that a plasticizer blended in the sheet material is transferred to an adjacent adhesive layer, resulting in the deteriorated adhesion thereof, and that the vinyl-chloride resin sheet suffers from elongation or shrinkage upon heating due to low thermal dimensional stability thereof, thereby causing wrinkles thereon. Since the vinyl-chloride resin film is readily deformable, it shows a good suitability for the V-cutting and bending processes, but since the vinyl-chloride resin film is deteriorated in resistance to impact deformation, there arises another problem that the thickness of the film must be sufficiently increased upon practical use.

Moreover, in recent years, there have been serious problems that the vinyl-chloride sheet generates a chlorine gas upon burning such as incineration, thereby causing sources for acid rain or dioxine. In consequence, there is an increasing demand that decorative plates or decorative sheets should be produced without using the vinyl-chloride resin sheet from a standpoint of environmental protection.

Meanwhile, as described above, since decorative plates and decorative sheets are used as a surface material, a picture pattern having a high design value is generally formed on a surface thereof. Therefore, it is extremely important to adjust or control color tones of the decorative plates or decorative sheets in order to obtain appropriate contrasts between the picture patterns or delicate contrasts of shade and shadow thereon. As the substrates of the decorative plates or the substrates to which decorative sheets are attached, various materials such as plywood, e.g., particle boards, steel boards or the like have been used. In general, these substrates have a variety of color tones which are different from each other even if the substrates are composed of the same material.

Accordingly, if individual films for the decorative sheet has a deteriorated hiding power, the color tone of the substrate adversely affects that of the surface of the decorative plate or decorative sheet, so that an inherent high design value of the picture pattern formed therein is damaged. For this reason, it is required that the sheet materials or films for the decorative plates or decorative sheets have a high hiding power, thereby enabling these sheet materials or films to be widely applicable to substrates having various color tones.

Incidentally, with respect to decorative plates using other films than the vinyl-chloride resin films, there have been proposed a decorative plate in which a laminated material composed of a polyolefin-based synthetic paper as base film or a flexible polyester film as a base film is used (Japanese Patent Application Laid-open (KoKai) No. 7-17005 (1995)); a decorative plate in which a laminated material composed of a thermoplastic transparent elastomer film selected from the group consisting of styrene-based films, olefin-based films, urethane-based films, fluororubber-based films, polyamide-based films and ester-based films, or an polyolefin-based resin is used (Japanese Patent Application Laid-open (KoKai) No. 6-79830 (1995)); or the like.

However, the afore-mentioned conventional decorative plates using the polyolefin-based resin films are not suitable for furniture or interior building materials, because these decorative plates show a large calorific value upon burning, e.g., upon fire. For this reason, there is a demand for decorative plates using other films than the polyolefin-based resin films.

Biaxially-oriented polyester films, typically a polyethylene terephthalate film, have been widely utilized in various fields because of their excellent properties. However, as disclosed in Japanese Patent Application Laid-open (KoKai) No. 7-17005 (1995), these biaxially-oriented polyester films conventionally proposed are used only as surface materials for decorative plates. However, there has not yet been any proposal that the biaxially-oriented polyester film is interposed between the substrate and the picture-printed layer, in other words, that the biaxially-oriented polyester film is used as a sheet material (base film) for decorative sheets.

As a result of intense studies by the present inventors, it has been found that by using a biaxially-oriented polyester film having an optical density of 0.1 to 5.0 and longitudinal and transverse heat shrinkage percentages of not less than −10.0% and not more than +10.0% after heat-treated at 180° C. for 5 minutes, the resulting decorative plate or sheet can generate no harmful gases upon burning such as incineration, can produce a picture pattern having a high design value thereon without adverse influence by the color tone of the substrate, and is excellent in dimensional stability. The present invention has been attained by the above finding.

SUMMARY OF THE INVENTION

It is an object of the present invention to provide a polyester film for a decorative plate or a decorative plate or sheet which can generate no harmful gases upon burning such as incineration, can produce a picture pattern having a high design value thereon without adverse influence by the color tone of the substrate, and is excellent in dimensional stability.

It is another object of the present invention to provide a polyester film for a decorative plate or sheet laminated by clear film which is considerably improved in V-cutting and bending properties and resistance to impact deformation, and is free from environmental pollution upon burning such as incineration.

To accomplish the aim, in a first aspect of the present invention, there is provided a polyester film for a decorative plate comprising at least the said polyester film and a picture-printed layer which are in turn laminated over a surface of a substrate, wherein the polyester film has a optical density of 0.1 to 5.0, and each of longitudinal and transverse heat shrinkage percentages of not less than −10.0% and not more than +10.0% after heat-treated at 180° C. for 5 minutes.

In a second aspect of the present invention, there is provided a polyester film for a decorative sheet laminated by clear film, which comprises a first adhesive layer, an inner film layer (A) comprising said polyester film, a picture printed layer, a second adhesive layer and an outer film layer (B) which are in turn laminated over a surface of a substrate, wherein said polyester film has longitudinal and transverse tensile moduli of not more than 600 kg/mm$^2$.

In a third aspect of the present invention, there is provided a decorative plate comprising a polyester film layer and a picture-printed layer which are in turn laminated over a surface of a substrate, wherein said polyester film layer has an optical density of 0.1 to 5.0, and longitudinal and transverse heat shrinkage percentages of not less than −10.0% to +10.0% after heat-treated at 180° C. for 5 minutes.

In a fourth aspect of the present invention, there is provided a decorative plate laminated by clear film, which comprises an adhesive layer, an inner film layer (A) comprising a polyester film, a picture printed layer and an outer film layer (B) which are in turn laminated over a surface of a substrate, wherein said polyester film has longitudinal and transverse tensile moduli of not more than 600 kg/mm$^2$.

In a fifth aspect of the present invention, there is provided a decorative sheet comprising a polyester film layer and a picture-printed layer laminated thereon, wherein said polyester film layer has an optical density of 0.1 to 5.0, and longitudinal and transverse heat shrinkage percentages of not less than −10.0% to +10.0% after heat-treated at 180° C. for 5 minutes.

In a sixth aspect of the present invention, there is provided a decorative sheet laminated by clear film, which comprises an adhesive layer, an inner film layer (A) comprising a polyester film, a picture printed layer and an outer film layer (B) which are in turn laminated thereover, wherein said polyester film has longitudinal and transverse tensile moduli of not more than 600 kg/mm$^2$.

DETAILED DESCRIPTION OF THE INVENTION

The present invention is described in detail below. The wording of "polyesters" used herein mean polymers having ester groups, which are produced by the polycondensation of dicarboxylic acid with diol or hydroxy-carboxylic acid.

Examples of the dicarboxylic acids include terephthalic acid, isophthalic acid, adipic acid, azelaic acid, sebacic acid, 2, 6-naphthalene-dicarboxylic acid, 1, 4-cyclohexane-dicarboxylic acid or the like. Examples of the diols include ethylene glycol, 1, 4-butane-diol, diethylene glycol, triethylene glycol, neopentyl glycol, 1, 4-cyclohexane-dimethanol, polyethylene glycol or the like. Examples of the hydroxy-carboxylic acids include p-hydroxy-benzoic acid, 6-hydroxy-2-naphthoic acid or the like.

Typical examples of the polyesters include polyethyleneterephthalate, polyethylene-2, 6-naphthalate or the like. The polyesters used in the present invention may be in the form of homopolymers or copolymers prepared by copolymerizing a third component therewith.

As described above, the decorative sheets according to the present invention can be used in combination with substrates having various color tones. Accordingly, it is important that the decorative sheet according to the present invention has a high hiding power such that the color tone of the substrate neither adversely affects that of the decorative sheet nor damage a high design value of the picture pattern formed therein. For this reason, in accordance with the present invention, the optical density of the polyester film used in the decorative sheet is defined to the range of 0.1 to 5.0. The afore-mentioned optical density of the polyester film is preferably in the range of 0.2 to 4.0, more preferably 0.5 to 3.0, most preferably 1.3 to 3.0.

The hiding power which is represented in terms of the afore-mentioned optical density, can be imparted by incorporating inorganic or organic particles into the polyester film. Examples of the inorganic or organic particles include titanium dioxide, calcium carbonate, barium sulfate, aluminum oxide, silicon dioxide, carbon black, iron oxide, chromium oxide or the like. Any other particles than the above-exemplified ones can also be used in the present invention as far as they can satisfy the requirement for the above-defined optical density. The inorganic or organic particles may be contained in the polyester film in an amount of 0.1 to 40% by weight, preferably 1.0 to 30% by weight. Furthermore, in order to enhance dispersion properties and weather resistance of the polyester film, particles surface-treated with oxides and/or organic compounds of aluminum, silicon, zinc or the like, may be used.

Alternatively, in order to impart the hiding power to the polyester film, isolated small cells or bubbles may also be incorporated therein. Specifically, the incorporation of the isolated small cells or bubbles in the polyester film may be performed by a method in which a small amount (for example, the amount of 1.0 to 50% by weight, preferably 5.0 to 30% by weight) of polyolefin non-compatible with the polyester is added to the polyester and the blended material is then subjected to an elongation and a heat-set; or a method in which an inert gas is contained in the polyester film.

When the optical density of the polyester film is less than 0.1, the color tone of the substrate to which the polyester film is adhered, adversely affects that of the picture pattern formed on the surface of the decorative sheet, thereby failing to accomplish the aim of the present invention. On the other hand, when the optical density of the polyester film is more than 5.0, the polyester film often suffers from breakage upon the production thereof or is deteriorated in its mechanical strength.

By using the polyester film according to the present invention, the decorative sheet possessing the picture pattern having a high design value on the surface thereof can be formed without adverse influence by the color tone of the substrate. Accordingly, when the decorative sheet composed of the polyester film according to the present invention and a picture pattern, and having a high design value is adhered to the surface of the substrate, it becomes possible to produce an excellent printed decorative plate. Also, the afore-mentioned decorative sheet is suitably applied to building materials, furniture, household appliances or the like. Further, in the production of the printed decorative plate, the polyester film may first be subjected, at the surface thereof, to a hiding-printing treatment and then to a picture-printing treatment. Alternatively, the polyester film on which the picture pattern have been printed, may be embossed and then covered with a top coat.

As described above, the polyester film according to the present invention exhibits an excellent hiding power so that only a single polyester film is used to produce a printed decorative sheet or plate. Also, the polyester film of two or more layers may be used for the production of decorative sheets or plates. For example, a plurality of the polyester films according to the present invention may be adhered to the surface of the substrate such as plywood. By such a multi-layer structure of the polyester film, the surface of the decorative sheet or decorative plate can be readily embossed.

If the decorative sheet has a deteriorated dimensional stability, wrinkles are generated thereon, resulting in damage to the high design value of the picture pattern. For this reason, in accordance with the present invention, the polyester film is required to exhibit longitudinal and transverse heat shrinkage percentages both being not less than −10.0% and not more than +10.0% after heat-treated at 180° C. for 5 minutes. The afore-mentioned heat shrinkage percentages are preferably in the range of not less than −7.0 and not more than +7.0%. When the heat shrinkage percentages are less than −10%, i.e., when the elongation in the corresponding directions thereof exceeds 10%, the surface of the decorative sheet is unsuitably swelled up, so that its appearance is considerably deteriorated. On the other hand, when the heat shrinkage percentages are more than +10%, there arise such problems that the decorative sheet is separated from surfaces of the building materials, furniture or the like, or the picture pattern is distorted.

Incidentally, wood materials have been favorably used for furniture, building materials, household appliances or the like. Specifically, ligneous color tones are favorably adopted because a space surrounded by such ligneous color tones, as seen in Japanese houses, contributes to mental rest or serenity of residents. In order to attain such effects, it is preferred that the polyester film itself have a color tone harmonious with the ligneous picture pattern in addition to the hiding power and the dimensional stability.

Therefore, in accordance with the present invention, the polyester film has a chromaticity (b value) of not less than −5.0, preferably not less than −4.0, more preferably −3.0. Especially, in the case where the color tone of the polyester film should be harmonious with that of an ordinary wood material, it is preferred that the chromaticity (b value) thereof be in the range between −5.0 to 50.0, so that the color tone of the surface material becomes less influenced, whereby the adjustment of color tones on the surface of the decorative sheet can be readily carried out. When the chromaticity (b value) of the polyester film is less than −5.0, the surface of the decorative plate is considerably tinged with blue, so that it exhibits a wintry appearance and therefore, loses a warm color tone inherent in wood materials.

Since the decorative plates laminated by clear film according to the present invention are composed of the afore-mentioned polyester film, such decorative plates are therefore excellent in self-recovery for dent deformation (resistance to impact deformation). Further, from a standpoint of attaining a high V-cutting and bending properties, it is preferred that the polyester film used in the present invention shows longitudinal and transverse tensile moduli of 190 to 600 kg/mm$^2$. The afore-mentioned longitudinal and transverse tensile moduli are preferably in the range of 190 to 550 kg/mm$^2$, more preferably 190 to 500 kg/mm$^2$.

If the longitudinal and transverse tensile moduli are more than 600 kg/mm$^2$, the polyester film is apt to return back to its original flat shape due to the elastic deformation when subjected to V-cutting and bending finish processes, so that the bent shape of the polyester film cannot be maintained stably for a long period of time. On the other hand, when the longitudinal and transverse tensile moduli of the polyester film are less than 190 kg/mm$^2$, there is a tendency that wrinkles or the like are caused in the polyester film due to a tension force thereof generated when it is adhered to the substrate, etc. so that the resulting decorative plate suffers from a wavy surface.

The thickness of the polyester film according to the present invention is generally in the range of 5 to 100 μm, preferably 12 to 80 μm. When the thickness of the polyester film is less than 5 μm, the substrate is highly susceptible to an impact applied to a surface of the decorative plate. As a result, especially if the substrate has a high surface hardness, a clear layer or a picture-printed layer formed on the surface of the decorative plate, which has a lower hardness than that of the substrate, is more severely damaged. On the other hand, when the thickness of the polyester film is more than 100 μm, a force required for bending the polyester film is increased, so that it is difficult to maintain the bent shape of the decorative plate.

Various dyes and/or pigments can be added to the polyester film according to the present invention.

Examples of the dyes include natural dyes such as indigo, or synthetic dyes such as azo dyes, anthraquinone dyes, indigoid dyes, sulfur dyes, triphenyl methane dyes, pyrazolone dyes, stilbene dyes, diphenyl methane dyes, xanthene dyes, alizarin dyes, acridine dyes, quinoneimine dyes (e.g., azine dyes, oxazine dyes or thiazine dyes), thiazole dyes, methine dyes, nitro dyes, nitroso dyes, cyanine dyes or the like. The content of these dyes is preferably in the range of 0.1 to 20% by weight.

Examples of the pigments include organic pigments such as phthalocyanine-based pigments, dioxazine-based pigments, anthraquinone-based pigments or the like, or inorganic pigments such as titanium white, zinc white, white lead, carbon black, red oxide, vermilion, cadmium red, chrome yellow, ultramarine blue, cobalt blue, cobalt violet, zinc chromate or the like. The content of these pigments is preferably in the range of 0.1 to 40% by weight. As the pigments, the organic pigments and inorganic pigments can be jointly used in order to obtain the afore-mentioned optical density (hiding power).

In accordance with the present invention, a method of adding the afore-mentioned particles, dyes and/or pigments to the polyester film is not particularly restricted but any known method can be used therefor. Incidentally, the surface of the polyester film according to the present invention may be covered with a coating material in order to impart anti-static properties, adhering properties or the like thereto.

In accordance with the present invention, the polyester film for a decorative plate or sheet, is free from generation of harmful gases upon burning, can display a picture pattern having a high design value and is excellent in dimensional stability, resulting in achievement of a large industrial value.

Further, the polyester film for a decorative sheet laminated by a clear film, is considerably improved in V-cutting properties and resistance to impact deformation and does not cause any environmental pollution upon burning, resulting in achievement of a large industrial value.

EXAMPLES

The present invention is described in detail below by way of examples, but these examples are not intended to limit the present invention and various modifications or changes thereof can be achieved without departing from the scope of the present invention.

Incidentally, various properties of the polyester film and decorative sheet or plate according to the present invention have been measured by the following methods.

Further, "parts" and "%" used in the following Examples and Comparative Examples mean "parts by weight" and "% by weight", respectively.

(1) Optical Density (Hiding Power)

The optical density of the polyester film has been determined by measuring an intensity of light transmitted through a G filter by a Macbeth illuminometer (TD-904 Model). It is indicated that the larger the optical density is, the higher the hiding power becomes.

(2) Heat Shrinkage Percentage

A sample film having a width of 25 mm and a length of 1.0 m was placed in a circulating hot air oven (manufactured by TABAIESPECK CO., LTD.) and subjected to free end-heat treatment at 100° C. for 5 minutes. The ratio of longitudinal dimension of the sample film after the heat-treatment to that before the heat-treatment was represented by %.

(3) Color Tone

By using a color analyzer ("TC-1800MKII-Model", manufactured by TOKYO DENSHOKU CO., LTD.), the color tone of the polyester film was measured in terms of "L", "a" and "b" values according to JIS Z-8722.

(4) Suitability for Decorative Sheet

A decorative sheet was adhered to a plywood, which was a black flat surface substrate, by using an ethylene/vinyl acetate-based adhesive ("CVC-36", produced by KONICA CO., LTD.) as an adhesive to prepare a decorative plate. A picture pattern printed on a surface of the decorative sheet were observed to determine whether or not the picture pattern suffered from any change in color tones and any deterioration in design value. The results of the observation were classified into the following three ranks:

○: Printed picture pattern were kept in a good condition without any deterioration in its design value.

X: Considerable change in color tone of the printed picture pattern and considerable deterioration in design value thereof were caused.

Δ: Picture pattern were in an intermediate condition between the above two ranks.

Further, the decorative plate was placed in a circulating hot air oven (manufactured by TABAIESPECK CO., LTD.) and heat-treated at 180° C. for 5 minutes. The heat-treated decorative sheet was then observed with respect to its surface condition. The results of the observation were classified into the following two ranks:

○: Decorative sheet was kept in a good surface condition without any change.

X: Wrinkles or shrinkage were caused on the surface of the decorative sheet.

Furthermore, a surface of another decorative sheet was embossed at 150° C. with a roll having protrusions on a surface thereof. The results were classified into the following ranks:

⊚: The embossing was especially easy to perform.

○: The embossing was readily performed.

X: The embossing was difficult to perform.

(5) Tensile Modulus

A sample film having a length of 300 mm and a width of 20 mm was placed in an atmosphere maintained at a temperature of 23° C. and a relative humidity of 50%, and stretched at a straining rate of 10% per minute by using a tension tester ("INTESCO-MODEL 2001", manufactured by INTESCO CO., LTD.) to obtain a tensile stress-strain characteristic curve. Using an initial linear part of the thus-obtained tensile stress-strain characteristic curve, the tensile modulus of the polyester film was calculated from the following formula:

$$E=\Delta\sigma/\Delta\epsilon$$

wherein E represents a tensile modulus (kg/mm$^2$), $\Delta\sigma$ represents a difference in stress between two points on the linear part based on an original average cross-sectional area, and $\Delta\epsilon$ represents a difference in strain between the two points.

(6) Suitability for V-cutting and Bending Processes

An optional picture pattern was first printed on an inner film (A). A polyester film having a thickness of 50 μm ("T600-50", produced by DIAFOIL HOECHIST CO., LTD.) or an acrylic film having a thickness of 50 μm ("ACRYPRENE HBS", produced by MITSUBISHI RAYON CO., LTD.) as an outer film (B) was laminated over the printed picture pattern to produce the decorative sheet. The lamination of the polyester film (B) was carried out by using a saturated polyester resin-based adhesive ("NICHIGO-POLYESTER (LP-035), produced by NIPPON GOSEI KAGAKU CO., LTD.).

The obtained decorative sheet was adhered to a plywood as a flat surface substrate having a black surface to produce a decorative plate laminated by clear film. The adhesion of the decorative sheet on the plywood was performed by using an ethylene/vinyl acetate-based adhesive ("CVC-36", produced by KONICA CO., LTD.) such that the inner film (A) was disposed at a surface side of the plywood.

The thus-prepared decorative plate was worked to form a V-cut groove thereon and then bent at the groove. The bent decorative plate was allowed to stand to observe whether or not the decorative plate returned back to its original flat shape, thereby determining its suitability for V-cutting and bending processes. The results of the observation were classified into the following ranks:

○: No return to its original shape was caused.

X: Return to its original shape was caused.

(7) Resistance to Impact Deformation

The afore-mentioned decorative plate was placed at a horizontal plane such that the decorative sheet faced upward. An iron ball having a weight of 100 g and a diameter of 3 cm was dropped from 50 cm height onto the decorative plate. The picture pattern on the decorative plate was observed at a position at which the iron ball was dropped, to determine whether or not any dent by falling ball was caused. The results of the observation were classified into the following ranks.

○: No dent by falling ball was recognized.

X: Dent by falling ball was clearly recognized.

Δ: Dent by falling ball was in an intermediate condition between the above two ranks.

(8) Hiding Property

The decorative sheet was observed from its front surface side to determine whether or not any change in color tone of the picture pattern was caused and a design value thereof is maintained. The results of the observation were classified into the following ranks:

○: The design value of the picture pattern was kept in a good condition without change in color tone.

X: The picture pattern suffered from considerable change in color tone and considerable deterioration in design value.

Δ: The picture pattern was in an intermediate condition between the above two ranks.

Example 1

100 parts of dimethyl terephthalate, 70 parts of ethylene glycol and 0.07 part of calcium acetate monohydrate were placed in a reaction vessel and heated to distill off methanol and conduct an ester exchange reaction therebetween. After about 4.5 hours from the initiation of the reaction, the temperature of the reaction mixture was reached to 230° C., upon which the ester-exchange reaction was substantially terminated.

Next, 0.04 part of phosphoric acid and 0.035 part of antimony trichloride were added to the reaction mixture. The resultant reaction mixture was then subjected to polymerization according to an ordinary method. Specifically, the temperature of the reaction mixture was gradually elevated up to a final temperature of 280° C., during which the pressure in the reaction vessel was gradually reduced to a final pressure of 0.05 mmHg. After 4 hours, the reaction was terminated and the reaction product was chipped by an ordinary method to obtain a polyester (A). 40 parts of the thus-obtained polyester (A) and 60 parts of rutile titanium dioxide were molten and mixed together in a twin-screw extruder by an ordinary method. Thereafter, the resultant mixture was chipped to obtain master batch polyester chips (B).

88 parts of the polyester chips (A) and 12 parts of the polyester chips (B) were separately dried at 180° C. for 5 hours and then mixed together. The obtained mixture was molten and extruded according to an ordinary method, and rapidly cooled and solidified. The extruded material (sheet) was in turn biaxially stretched 2.9 times in the longitudinal direction at 83° C. and 3.2 times at 125° C. in the transverse direction, respectively, and then heat-treated at 210° C., so that a biaxially stretched polyester film having a thickness of 38 μm was obtained. An optional picture pattern was printed on the surface of the thus-obtained biaxially stretched polyester film to prepare a decorative sheet. The thus-prepared decorative sheet was adhered to a plywood as a flat surface substrate by using an ethylene-vinyl acetate-based adhesive ("CVC-36", produced by KONICA CO., LTD.) such that the picture pattern faced outward.

Properties of the resultant polyester film and decorative plate are shown in Table 1. As is appreciated from Table 1, it was found that the thus-prepared polyester film exhibited a considerably good suitability for decorative sheet.

Example 2

The same procedure as defined in Example 1 was conducted except that a polyester chips (C) were used instead of the polyester chips (B), wherein upon the production of the polyester chips (B), 3.5 parts of anthraquinone as a yellow pigment, 0.1 part of carbon black and 2.0 parts of iron oxide in addition to 40 parts of the polyester (A) and 60 parts of rutile titanium dioxide, were blended together, the resultant mixture was molten and intimately mixed together in a twin-screw extruder, and then chipped to produce master batch polyester chips (C), thereby obtaining a biaxially stretched polyester film. Further, the thus-prepared polyester film was adhered to the plywood as a flat surface substrate in the same manner as in Example 1, to produce a decorative plate.

Properties of the above-prepared polyester film and decorative plate were also shown in Table 1. As is appreciated from Table 1, it was found that the thus-prepared polyester film exhibited a considerably good suitability for decorative sheet.

Example 3

The same procedure as defined in Example 1 was conducted except that the polyester film was produced from the composition composed of 4 parts of the polyester chips (B), 13 parts of polyolefin and 83 parts of the polyester chips (A), thereby obtaining a biaxially stretched polyester film. Further, the thus-prepared polyester film was adhered to the plywood as a flat surface substrate in the same manner as in Example 1, to produce a decorative plate.

Properties of the above-prepared polyester film and decorative plate were also shown in Table 1. As is appreciated from Table 1, it was found that the thus-prepared polyester film exhibited a considerably good suitability for decorative sheet.

TABLE 1

|  | Example 1 | Example 2 | Example 3 |
|---|---|---|---|
| OPTICAL DENSITY | 1.48 | 1.52 | 0.50 |
| HEAT SHRINKAGE PERCENTAGE | | | |
| MD (%) | 3.5 | 3.5 | 3.0 |
| TD (%) | 0.5 | 0.5 | 0.5 |
| CHROMATICITY (b value) | 1.0 | 25.1 | −4.0 |
| SUITABILITY FOR DECORATIVE SHEET | | | |
| Change in color tone | ◯ | ◯ | ◯ |
| Surface condition | ◯ | ◯ | ◯ |
| Easiness in embossing | ◯ | ◯ | ⊚ |
| TOTAL EVALUATION | ◯ | ◯ | ◯ |

Example 4

Polyethylene terephthalate containing 13.5% by weight of titanium dioxide and 0.5% by weight of wet silica was dried at 180° C. for 4 hours. The polyethylene terephthalate was extruded at 290° C. by using a melt-extruder. Using an electrostatic pinning method, the extruded polyethylene terephthalate was cooled and solidified by passing over a cooling roll whose surface was maintained at 40° C., to obtain an unstretched film. The thus-obtained unstretched film was stretched 2.5 times in the longitudinal direction at 85° C., thereby obtaining a longitudinally stretched film.

Next, the thus-obtained longitudinally stretched film was introduced into a tentering machine, stretched 3.2 times in the lateral direction by a tentering machine at 120° C. and thereafter heat-set at 210° C., thereby obtaining a biaxially stretched polyester film having a thickness of 50 μm. The thus-prepared biaxially stretched polyester film was used as the inner film (A) and the afore-mentioned polyester film having a thickness of 50 μm ("T600-50", produced by DIAFOIL HOECHIST CO., LTD.) was used as the outer film (B) to prepare a decorative sheet laminated by a clear film. Specifically, the preparation of the decorative sheet laminated by a clear film was conducted in the following manner. First, an optional picture pattern was printed on the inner film (A). The polyester film having a thickness of 50 μm ("T600-50", produced by DIAFOIL HOECHIST CO., LTD.) as the outer film (B) was laminated over the picture pattern on the inner film (A) through a saturated polyester resin-based adhesive ("NICHIGO-POLYESTER (LP-035), produced by NIPPON GOSEI KAGAKU CO., LTD.), thereby obtaining a decorative sheet. Successively, the thus-obtained decorative sheet was adhered to a plywood as a flat surface substrate by using an ethylene/vinyl acetate-based adhesive ("CVC-36", produced by KONICA CO., LTD.), thereby obtaining the afore-mentioned decorative plate laminated by a clear film. The thus-prepared decorative plate laminated by a clear film was examined to evaluate various properties thereof. The results are shown in Table 2.

Example 5

The same procedure as defined in Example 4 was conducted except that the amounts of titanium dioxide and wet silica to be added to the polyethylene terephthalate were changed to 7.0% by weight and 0.5% by weight, respectively, to obtain a biaxially stretched polyester film. Further, a decorative sheet laminated by a clear film was prepared in the same manner as defined in Example 4 except that the thus-obtained biaxially stretched polyester film was used as the inner film (A) and the afore-mentioned acrylic film having a thickness of 50 μm ("ACRYPRENE HBS", produced by MITSUBISHI RAYON CO., LTD.) was used as the outer film (B). The thus-prepared decorative plate laminated by a clear film was examined to evaluate various properties thereof. The results are also shown in Table 2.

Example 6

The same procedure as defined in Example 4 was conducted except that 7.3% by weight of titanium dioxide, 0.01% by weight of carbon black, 0.2% by weight of red oxide, 0.4% by weight of anthraquinone-based yellow pigment and 0.5% by weight of wet silica were added to polyethylene terephthalate, to obtain a biaxially stretched polyester film. Further, a decorative sheet laminated by a clear film was prepared in the same manner as defined in Example 4 except that the thus-obtained biaxially stretched polyester film was used as the inner film (A) and the afore-mentioned polyester film having a thickness of 50 μm ("T600-50", produced by DIAFOIL HOECHIST CO., LTD.) was used as the outer film (B). The thus-prepared decorative plate laminated by a clear film was examined to evaluate various properties thereof. The results are also shown in Table 2.

Example 7

Polyethylene terephthalate having 30 mol % of an isophthalic acid component and containing 7.3% by weight of titanium dioxide, 0.01% by weight of carbon black, 0.2% by weight of iron oxide red, 0.4% by weight of anthraquinone-based yellow pigment and 0.5% by weight of wet silica, was dried at 70° C. for one week in a vacuum dryer. Thereafter, the dried polyethylene terephthalate was extruded at 250° C.

by using a melt-extruder. Using an electrostatic pinning method, the extruded polyethylene terephthalate was cooled and solidified by passing over a cooling roll whose surface was maintained at 10° C., thereby obtaining an unstretched polyethylene terephthalate film was obtained. The thus-obtained unstretched polyethylene terephthalate film was stretched 2.5 times in the longitudinal direction at 50° C., thereby obtaining a longitudinally stretched film.

Next, the thus-obtained longitudinally stretched film was stretched 3.0 times in the lateral direction by a tentering machine at 90° C. and thereafter, heat-set at 150° C., thereby obtaining a biaxially stretched polyester film having a thickness of 50 μm. Further, a decorative sheet laminated by a clear film was prepared in the same manner as defined in Example 4 except that the thus-prepared biaxially stretched polyester film as the inner film (A) and the afore-mentioned polyester film having a thickness of 50 μm ("T600-50", produced by DIAFOIL HOECHIST CO., LTD.) as the outer film (B) were used. The thus-prepared decorative sheet laminated by a clear film was examined to evaluate various properties thereof. The results are also shown in Table 2.

by weight of titanium dioxide and 0.5% by weight of wet silica were added, was used, thereby obtaining a biaxially stretched polyester film having a longitudinal tensile modulus of 500 kg/mm² and a transverse tensile modulus of 550 kg/mm². Further, a decorative sheet laminated by a clear film was prepared in the same manner as defined in Example 4 except that the thus-obtained biaxially stretched polyester film was used as the inner film (A) and the afore-mentioned polyester film having a thickness of 50 μm ("T600-50", produced by DIAFOIL HOECHIST CO., LTD.) was used as the outer film (B). The thus-prepared decorative sheet laminated by a clear film was examined to evaluate various properties thereof. The results are also shown in Table 2.

TABLE 2

|  | Example 4 | Example 5 | Example 6 | Example 7 | Example 8 | Example 9 |
|---|---|---|---|---|---|---|
| INNER FILM |  |  |  |  |  |  |
| Thickness (μm) | 50 | 50 | 50 | 50 | 100 | 50 |
| Tensile modulus (kg/mm²) |  |  |  |  |  |  |
| Longitudinal | 440 | 440 | 440 | 300 | 190 | 500 |
| Transverse | 480 | 480 | 480 | 300 | 190 | 550 |
| Optical density | 0.8 | 0.5 | 1.7 | 1.7 | 0.1 | 0.4 |
| Chromaticity (b value) | 1.0 | 1.0 | 34.0 | 34.0 | 1.0 | 1.0 |
| SUITABILITY FOR DECORATIVE SHEET |  |  |  |  |  |  |
| Suitability for V-cutting and bending processes | ○ | ○ | ○ | ⊙ | ⊙ | ○ |
| Resistance to impact deformation | ○ | ○ | ○ | ○ | ○ | ○ |
| Hiding power | ⊙ | ⊙ | ⊙ | ⊙ | Δ | ○ |
| TOTAL EVALUATION | ○ | ○ | ⊙ | ⊙ | ○ | ○ |

Example 8

The same procedure as defined in Example 4 was conducted except that polyethylene terephthalate to which 0.6% by weight of titanium dioxide and 0.5% by weight of wet silica were added, was extruded and then the extruded polyethylene terephthalate was cooled and solidified by passing over a cooling roll but not subjected to stretching, thereby obtaining an unstretched polyester film having a thickness of 100 μm. Further, a decorative sheet laminated by a clear film was prepared in the same manner as defined in Example 4 except that the thus-obtained unstretched polyester film was used as the inner film (A) and the afore-mentioned polyester film having a thickness of 50 μm ("T600-50", produced by DIAFOIL HOECHIST CO., LTD.) was used as the outer film (B). The thus-prepared decorative sheet laminated by a clear film was examined to evaluate various properties thereof. The results are also shown in Table 2.

Example 9

The same procedure as defined in Example 4 was conducted except that polyethylene terephthalate to which 5%

What is claimed is:

1. A laminate for a decorative plate comprising a substrate of a wood material, a polyester film laminated on the substrate, and a picture-printed layer on the polyester film, wherein the polyester film has an optical density of 0.1 to 5.0, a longitudinal and transverse heat shrinkage percentages of individually between −10.0% and +10.0% after the film is heat-treated at 180° C. for 5 minutes, and a chromaticity of more than −5.0, further comprising a first adhesive layer between the substrate and the polyester film, a second adhesive layer on the picture printed layer and an outer film layers on the second adhesive, and wherein the polyester film has a longitudinal and transverse tensile moduli in each direction individually of less than 600 kg/mm².

2. A laminate according to claim 1, wherein the polyester film has longitudinal and transverse tensile moduli in each direction individually of 190 to less than 600 kg/mm².

3. A laminate according to claim 1, wherein the chromaticity is from −5.0 to 50.0.

4. A laminate for a decorative sheet laminated by clear film, which comprises a first adhesive layer on a substrate of a wood material, an inner film layer comprising a polyester film on the first adhesive layer, a picture printed layer on the polyester film, a second adhesive layer on the picture printed layer, and an outer film layer on the second adhesive layer, wherein the polyester film has longitudinal and transverse tensile moduli in each direction individually of less than 600 kg/mm².

5. A laminate for a decorative sheet according to claim 4, wherein said polyester film has longitudinal and transverse tensile moduli in each direction individually of 190 to less than 600 kg/mm².

6. A decorative plate comprising a substrate of wood material, a polyester film layer on the substrate, and a picture-printed layer on the polyester film layer, wherein said polyester film layer has an optical density of 0.1 to 5.0, and longitudinal and transverse heat shrinkage percentages in each direction individually of between −10.0% and +10.0% after the film is heat-treated at 180° C. for 5 minutes, which further comprises an adhesive layer between the substrate and the polyester film, and an outer film layer on the picture printed layer, wherein said polyester film has longitudinal and transverse tensile moduli in each direction individually of less than 600 kg/mm².

7. A decorative plate according to claim 6, wherein said polyester film layer has a chromaticity of more than −5.0.

8. A decorative plate according to claim 6, wherein said polyester film has longitudinal and transverse tensile moduli in each direction individually of 190 to less than 600 kg/mm².

9. A decorative plate comprising an adhesive layer on a substrate of wood material, an inner film layer on the adhesive layer comprising a polyester film on the adhesive layer, a picture printed layer on the polyester film, and an outer film layer on the picture printed layer, wherein the polyester film has longitudinal and transverse tensile moduli in each direction individually of less than 600 kg/mm².

10. A decorative plate according to claim 9, wherein said polyester film has longitudinal and transverse tensile moduli in each direction individually of 190 to less than 600 kg/mm².

11. A decorative sheet comprising a polyester film layer and a picture-printed layer laminated thereon, wherein said polyester film layer has an optical density of 0.1 to 5.0, and longitudinal and transverse heat shrinkage percentages of between −10.0% to +10.0% after the film is heat-treated at 180° C. for 5 minutes, which further comprises a substrate of a wood material, and adhesive layer on the substrate, wherein said polyester film is on the adhesive layer, and an outer film layer on said picture printed layer, wherein said polyester film has longitudinal and transverse tensile moduli in each direction individually or less than 600 kg/mm².

12. A decorative sheet according to claim 11, wherein said polyester film layer has a chromaticity of not less than −5.0.

13. A decorative sheet according to claim 11, wherein said polyester film has longitudinal and transverse tensile moduli in each direction individually of 190 to less than 600 kg/mm².

14. A decorative sheet according to claim 11, wherein the chromaticity of the polyester film is from −5.0 to 50.0.

15. A decorative sheet consisting essentially of an adhesive layer, an inner film layer on the adhesive layer comprising a polyester film on the adhesive layer, a picture printed layer on the polyester film, and an outer film layer on the polyester film, wherein said polyester film has longitudinal and transverse tensile moduli in each direction individually of less than 600 kg/mm².

16. A decorative sheet according to claim 15, wherein said polyester film has longitudinal and transverse tensile moduli in each direction individually of 190 to less than 600 kg/mm.

* * * * *